United States Patent [19]
Geschke et al.

[11] Patent Number: 5,654,686
[45] Date of Patent: Aug. 5, 1997

[54] ELECTRONIC VEHICLE THEFT DETECTION SYSTEM EMPLOYING A MAGNETIC FIELD SENSOR

[75] Inventors: James R. Geschke; Thomas R. Olson, both of Holland, Mich.

[73] Assignee: Prince Corporation, Holland, Mich.

[21] Appl. No.: 507,807

[22] Filed: Jul. 26, 1995

[51] Int. Cl.⁶ .................................................. B60R 25/10
[52] U.S. Cl. .................... 340/426; 340/425.5; 340/988; 364/457
[58] Field of Search .................. 340/426, 423.5, 340/988, 992, 994; 364/424.01, 424.02, 443, 457

[56] References Cited

U.S. PATENT DOCUMENTS

| | | |
|---|---|---|
| 3,665,386 | 5/1972 | Dosch ............................ 340/426 |
| 3,746,842 | 7/1973 | Fowler . |
| 4,284,984 | 8/1981 | Scarpino, III et al. . |
| 4,359,717 | 11/1982 | Huber et al. . |
| 4,414,541 | 11/1983 | Ho . |
| 4,546,551 | 10/1985 | Franks ............................ 364/559 |
| 4,584,569 | 4/1986 | Lopez et al. . |
| 4,651,128 | 3/1987 | Kolb . |
| 4,864,288 | 9/1989 | Cross . |
| 5,053,023 | 10/1991 | Kozikaro ........................ 340/988 |
| 5,155,467 | 10/1992 | Matsubara . |
| 5,223,844 | 6/1993 | Mansell et al. .................. 342/457 |
| 5,440,303 | 8/1995 | Kinoshita ........................ 340/901 |
| 5,457,438 | 10/1995 | Ziegler ............................ 340/426 |

*Primary Examiner*—Donnie L. Crosland
*Attorney, Agent, or Firm*—Price, Heneveld, Cooper, DeWitt & Litton

[57] ABSTRACT

An electronic vehicle theft detection system employing a magnetic field sensor for mounting within a vehicle to provide signal information representing the earth's magnetic field. The sensor is coupled to an electrical processing circuit for sampling the data provided by the sensor and for generating a theft alarm signal when the heading of the vehicle has changed due to unauthorized movement of the vehicle.

27 Claims, 7 Drawing Sheets

ELECTRONIC VEHICLE THEFT DETECTION SYSTEM EMPLOYING A MAGNETIC FIELD SENSOR

BACKGROUND OF THE INVENTION

The present invention relates to theft detection systems and particularly those for use in vehicles.

Automotive vehicles are an important aspect of life in modern society. Beyond simply providing a means of transportation, vehicles today also provide consumers with a variety of optional features to maximize convenience, comfort, and safety. The trend towards accesorization, however, has caused automotive vehicles to become more expensive and thus more valuable. As an unfortunate result, the threat of automotive theft has become an increasingly important concern.

A multitude of alarm systems have been designed to prevent or deter the theft of automobile vehicles. The operation of many of these systems is dependent upon the detection of activity which is likely to be attributable to vehicle theft. One method of theft detection involves sensing unauthorized movement of a vehicle and is especially useful for preventing vehicle theft accomplished by towing the vehicle or placing it on a flat-bed track. Alarm systems usually employ sensors which are dependent upon the motion of the vehicle causing mechanical movement of internal sensor elements. One type of sensor senses vehicle motion by monitoring an internal sensor variable, such as magnetic flux, inductance, or induced voltage, which changes due to movement of an internal movable sensor element such as a magnet or a drop of mercury. Mother type of sensor senses vehicle motion by monitoring an internal sensor variable, such as capacitance or resistance, which changes due to movement of special fluids within the sensor.

Although these prior art systems provide a measure of protection against vehicle theft, their dependency on the motion of the vehicle causing movement of internal sensor elements may result in the non-detection of vehicle motion in some circumstances. In particular, these systems may have difficulty sensing vehicle theft when the vehicle is initially parked on an incline because the position of the vehicle may prevent proper motion of the internal sensor elements. Furthermore, the mechanical nature of the sensors of most of these prior art theft detection systems increases the cost of the systems and can reduce their reliability. Also, the sensors of these systems are application specific such that they cannot be used to provide functions in addition to theft detection.

Thus, a need exists for a theft detection system designed to detect vehicle motion without dependency upon the mechanical movement of internal system elements such that vehicle theft can be detected in all situations and that the expense of the system is minimized and its reliability improved. Furthermore, a theft detection system having a sensor that is useful in applications in addition to theft detection would be preferred.

SUMMARY OF THE INVENTION

The present invention provides an improved automotive theft detection system which detects vehicle theft by sensing unauthorized movement of a vehicle. The system's operation is not mechanical in nature such that vehicle theft can be detected in all situations and the expense of the system is minimized. In the preferred embodiment, a compass system is also implemented such that a vehicular feature, in addition to theft detection, is provided by much of the same electrical circuitry.

The present invention includes a magnetic field sensor for mounting within a vehicle to provide signal information representing the earth's magnetic field sensed within the vehicle. The sensor is coupled to an electrical processing circuit for sampling the data provided by the sensor and for generating a theft alarm signal when the heading of the vehicle has changed due to movement of the vehicle caused by vehicle theft. In the preferred embodiment, the electrical processing circuit includes a microprocessor programmed to analyze the sensor data and to use such data to provide a combined theft detection and compass system.

These and other features, advantages and objects of the present invention will be further understood and appreciated by those skilled in the art by reference to the following specification, claims and appended drawings.

DETAILED DESCRIPTION OF PREFERRED EMBODIMENT

Figure 1:
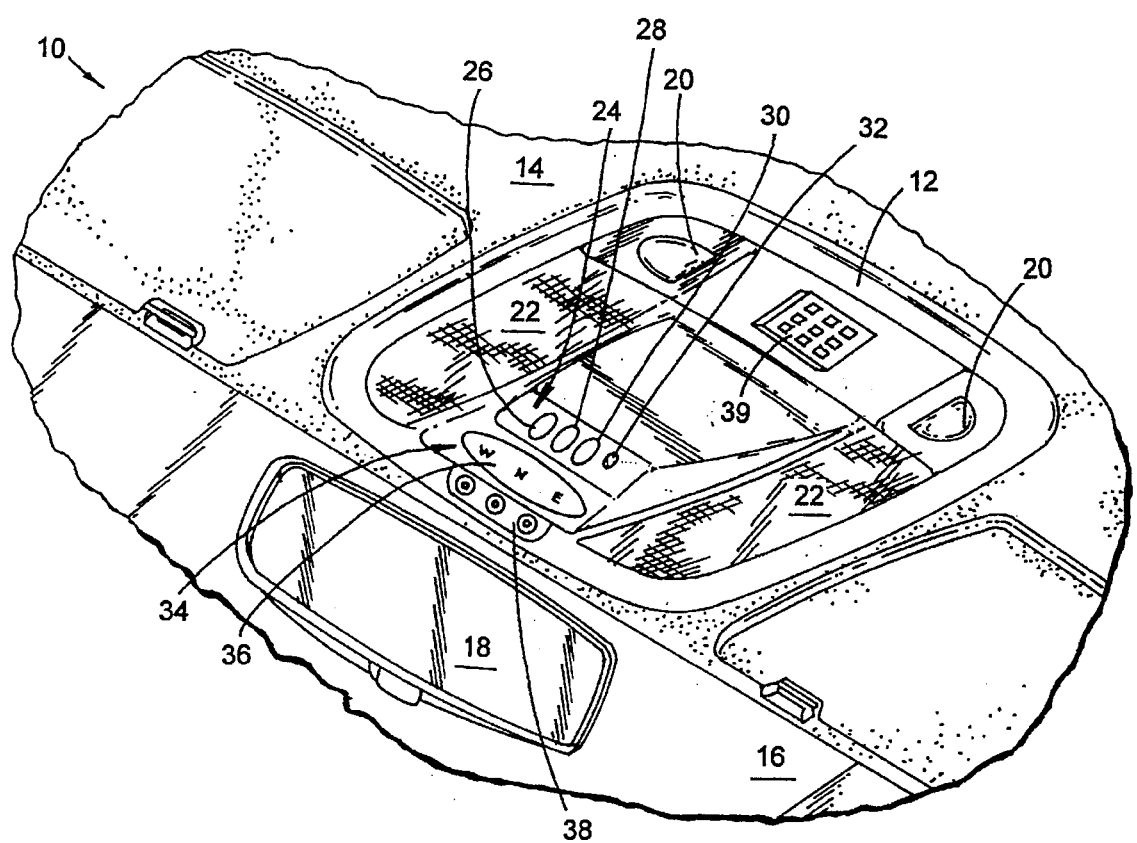
FIG. 1 is a fragmentary perspective view of a vehicle embodying the present invention.

In FIG. 1, there is shown a vehicle 10 such as an automobile which includes an overhead console 12 mounted to the roof 14 of the vehicle during manufacture, although it could be separately added at a later time. Console 12 is centered near the top edge of windshield 16 typically above the rearview mirror 18 and includes a pair of switches 20 for operating lamps positioned behind lenses 22 which in turn direct illumination into the lap area of either the driver or passenger side of the vehicle depending on which switch is actuated. The center of the console includes a trainable garage door opening transmitter 24 of the type disclosed in allowed U.S. patent application Ser. No. 08/055,509, filed Apr. 30, 1993, and entitled TRAINABLE TRANSMITTER WITH OUTPUT ATTENUATION CONTROL. This trainable transmitter can learn the RF frequency, modulation scheme, and security code of up to three existing remote transmitters. Thus, console 12 including trainable transmitter 24, can replace three separate remote control transmitters usually loosely stored in the vehicle. The transmitter includes three control switches 26, 28, and 30 and an indicator LED 32 for the display of training prompting information to the vehicle operator. Console 12 also includes a display panel 34, the center of which includes a digital display 36 providing, in one embodiment of the invention, a sixteen point compass display of the vehicle heading. Console 12 also includes display control buttons 38, keypad 39, and the theft detection circuit shown in FIG. 2 which is appropriately mounted therein.

Figure 2:
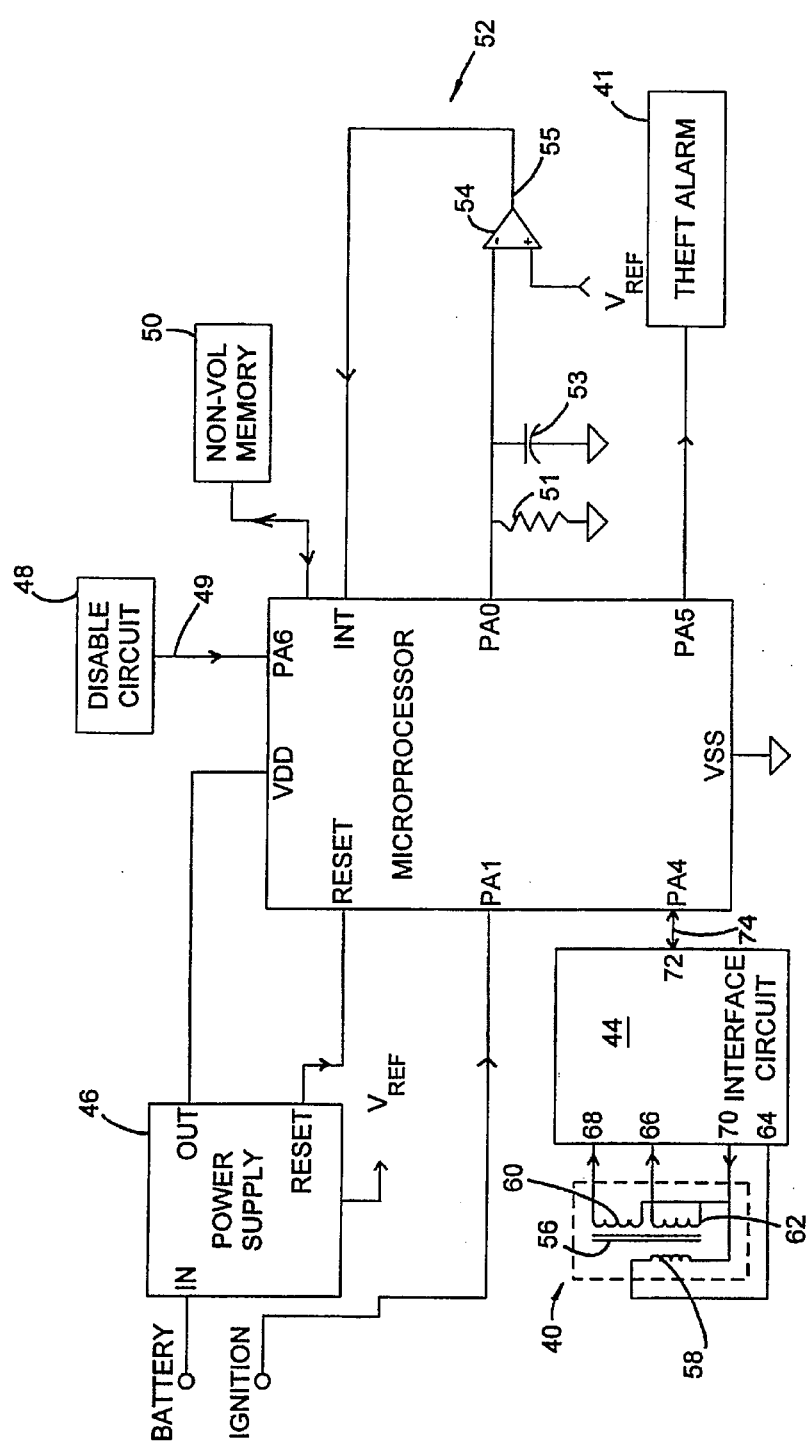
FIG. 2 is an electrical circuit diagram partly in block and schematic form of the theft detection system embodying the present invention.

Referring now to FIG. 2, the theft detection system of the present invention includes a flux-gate type magnetic field sensor 40 coupled to microprocessor 42 through an electrical interface circuit 44. Microprocessor 42 and circuit 44 comprise a processing circuit for processing signals from sensor 40, as described below. Also coupled to microprocessor 42 in a conventional manner is a power supply circuit 46, a disable circuit 48, a non-volatile memory circuit 50, and a timer circuit 52. The functioning and interconnection of these circuits is now described in more detail.

In the preferred embodiment of the present invention, microprocessor 42 is an HC05 eight-bit microprocessor manufactured by the Motorola Corporation. Operating power is supplied to microprocessor 42 by means of connection to power supply circuit 46 which is coupled to the vehicle's battery (not shown). Circuit 46 essentially functions as a voltage regulator and converts the battery supply voltage, typically 12 volts, to five volts which is supplied to terminal $V_{DD}$ of microprocessor 42. Circuit 46 also provides a reset signal to the RESET pin of microprocessor 42 approximately ten milliseconds after the five-volt operating power is initially supplied to terminal $V_{DD}$. The purpose of this signal is to reset microprocessor 42 so that it begins its processing cycle at the appropriate time after connection of a battery to the vehicle.

Microprocessor 42 receives timing signals defining an interrupt for execution of the Theft Detection Routine as described in connection with the program flow diagrams. This signal is applied to the microprocessor via output terminal 55 of a timer circuit 52 which comprises a resistor 51, a capacitor 53, and a comparator 54. Capacitor 53 is selectively charged by the output from pin PA0 of microprocessor 42. When pin PA0 is switched to a high impedance level, the charge on capacitor 53 drains through resistor 51 with the rate of discharge proportional to the size of resistor 51. When the charge on capacitor 53 has sufficiently drained such that the voltage on the negative input terminal 55 of comparator 54 is less than a reference voltage (VREF) of one volt maintained at its positive input terminal by a suitable voltage divider network (not shown) within supply 46, the output terminal 55 of comparator 54 supplies a logic "1" signal to the INT (interrupt) pin of microprocessor 42, for reasons discussed below. In the preferred embodiment, the time for capacitor 53 to discharge such that a signal is supplied to the INT pin of microprocessor 42 is approximately five seconds which Corresponds to a value for resistor 51 of approximately ten megohms.

Non-volatile memory circuit 50 provides an alternate source of information storage to microprocessor 42. Unlike the typical RAM memory within the microprocessor 42, memory 50 can maintain its information storage when power is discontinued. As described below, microprocessor 42 stores certain variables in circuit 50 before the microprocessor enters a low-power mode to ensure that the values of the variables are properly retained.

As described below, the preferred embodiment of the theft detection system is automatically initiated when the ignition system of a vehicle is turned off. Disable circuit 48 of FIG. 2 provides to the vehicle's operator a means by which to disable the system such that automatic initiation does not occur. This is desirable in many non-theft situations such as when a vehicle is towed to an automotive repair shop for repairs. Circuit 48 preferably is a keypad 39 (FIG. 1) into which a coded input signal is entered and which provides a disable output signal at terminal 49 which is coupled to terminal PA6 of microprocessor 42. If the operator's input disable code matches a predetermined code stored in the microprocessor's memory, then the theft detection system is disabled. The theft detection system then remains in a disabled state until another coded input signal is entered via circuit 48 which matches a predetermined code stored in the memory of microprocessor 42.

As shown in FIG. 2, microprocessor 42 receives via terminal PA1 an input signal from the vehicle's ignition system enabling the status of the system to be determined. As described below, the theft detection system of the preferred embodiment is operational only when microprocessor 42 determines that the vehicle's ignition is off. Some vehicles have the capability of detecting and differentiating between different phases of the ignition system cycle such that the above-mentioned determination can be based on whether an ignition key is in the ignition keyhole. The advantage of this capability is discussed below. Normally, the ignition signal is a discrete input signal obtained by means of a direct connection between microprocessor 42 and the vehicle's ignition system. However, the ignition signal may also be received via the vehicle's internal bus system.

Microprocessor 42 is also shown coupled to a theft alarm 41 via terminal PA5. As discussed below, microprocessor 42 outputs a theft alarm signal when sensor 44 provides signal information indicating vehicle theft is being attempted. The theft alarm signal may be transmitted to a variety of locations, directly or via the vehicle's internal bus system, to indicate that a vehicle theft is occurring. Examples include sending the theft alarm signal to the vehicle's horn to sound an alarm, to the computer or engine control within the engine to prevent operation thereof, to a pager module to transmit a message to the vehicle's owner, or to the vehicle's phone to automatically contact the police. Theft alarm 41 illustrates such connections but also could be a separate alarm horn, siren, flashing light, or the like to draw attention to the vehicle and deter the would-be thief.

Sensor 40 is a flux-gate sensor in the preferred embodiment, although other types of sensors may be employed including frequency-based capacitative or magneto-resistive or inductive type sensors. Sensor 40 includes an annular core 56 around which is wound a primary winding 58, a secondary East/West sensing winding 60, and a secondary North/South sensing winding 62. Primary winding 58 is driven by zero to five-volt signals supplied by terminal 64 of interface circuit 44 to selectively drive annular core 56 into saturation. Secondary windings 60 and 62 supply signals, representing the magnetic field sensed within the vehicle along two axes of measurement, to terminals 68 and 66, respectively, of interface circuit 44. The windings of sensor 40 are provided an intermediate reference ground through connection to terminal 70 of interface circuit 44 which is held at 2.5 volts.

Interface circuit 44 essentially serves as an interface between sensor 40 and microprocessor 42, performing the same functions as the corresponding individual circuit components detailed in U.S. Pat. No. 4,953,305, issued on Aug. 4, 1990, entitled VEHICLE COMPASS WITH AUTOMATIC CONTINUOUS CALIBRATION, assigned to the present assignee, and incorporated herein by reference. Interface circuit 44 preferably is an application specific integrated circuit (ASIC) essentially incorporating the individual circuits of the prior interface circuit in a conventional manner to reduce cost. Interface circuit 44 converts the analog signals from sensing windings 60 and 62 of sensor 40 into eight-bit digital signals (count values) which represent the magnetic field strength, in milligauss, detected by the two channels of sensor measurement. Each count value represents four to five milligauss of magnetism in the preferred embodiment of the present invention, although other conversion ratios may be employed. The digital signals generated by interface circuit 44 are supplied via terminal 72 to terminal PA4 of microprocessor 42 over bi-directional serial communication line 74.

Figure 3:
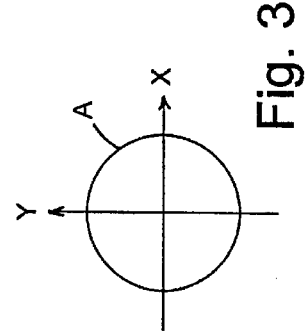
FIG. 3 is a graph illustrating the ideal signal received from the magnetic field sensor through the interface circuit.

The digital signals supplied by circuit 44 to microprocessor 42, representing the magnetic field sensed by the North/South and East/West channels of sensor 40, can be plotted on an X-Y coordinate plane, as shown in FIG. 3. The magnetic field strength, in milligauss, of the East/West channel is represented by the X axis, and the magnetic field strength, in milligauss, of the North/South channel is represented by the Y axis. For a properly calibrated sensor, the plotted channel data creates a perfect circle around the origin of the coordinate plane when the vehicle is moved in a 360° loop, as indicated by graph A. The radius of the circle represents the earth's magnetic field strength, and the vehicle's compass heading at a particular time is represented by a point on the circle.

Figure 4:
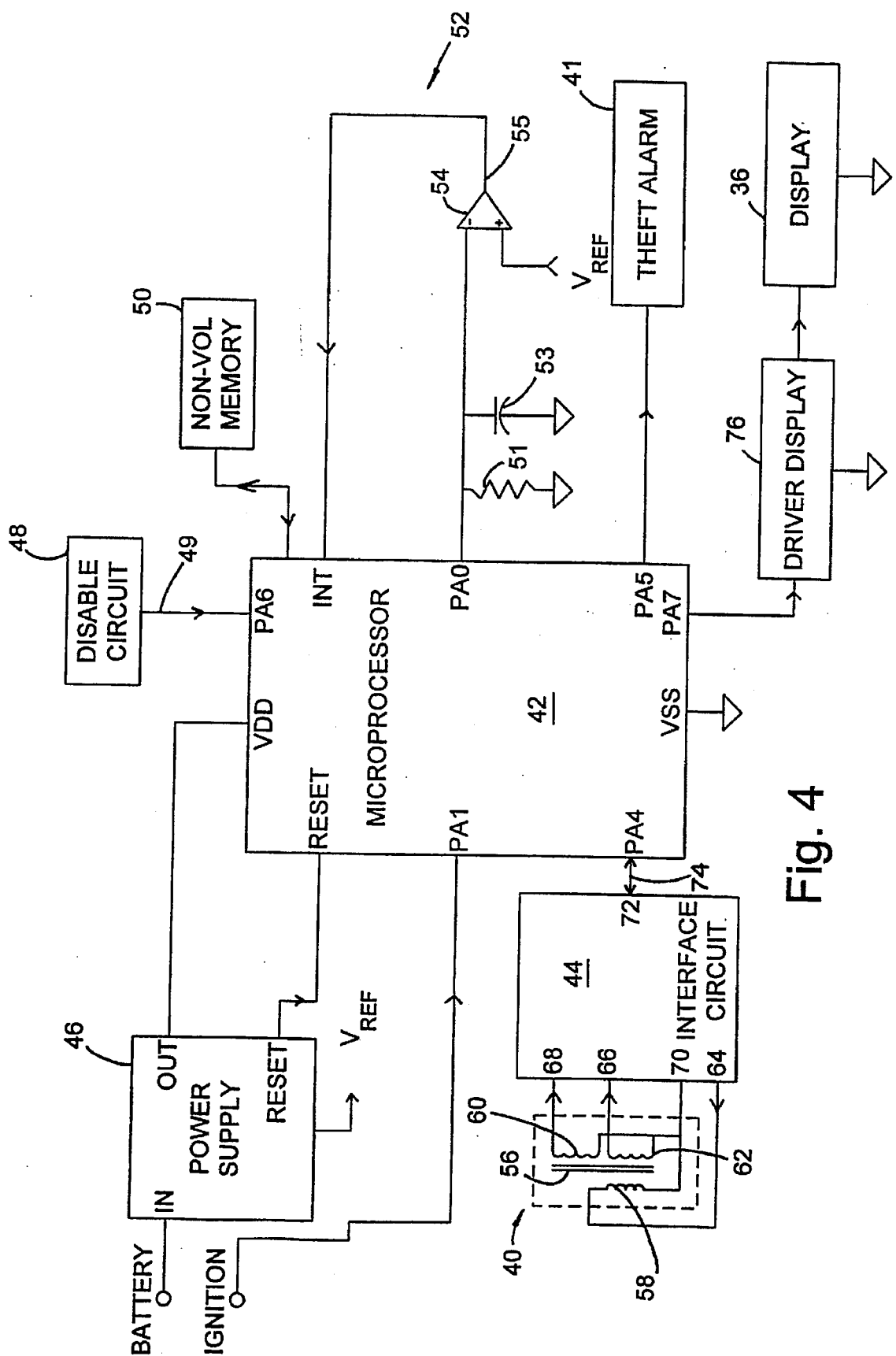
FIG. 4 is an electrical circuit diagram partly in block and schematic form of the preferred embodiment of the theft detection system in which a vehicle compass system is provided.

A particular advantage of the theft detection system of the present invention is its compatibility with a vehicle compass system providing heading information to the operator of the vehicle. An example of such a compass system is disclosed in the above-identified U.S. Pat. No. 4,953,305, the disclosure of which is incorporated herein by reference. As such, the preferred embodiment of the present invention provides a combined theft detection and compass system, the implementation of which is facilitated since much of the required circuitry is common to both systems. This enables a substantial cost-savings in the providing of two distinct and usually separate vehicle accessories. The only additional circuitry (i.e., hardware) required for the compass system is a display for displaying heading information to the vehicle's operator. The combined hardware for such a theft detection and compass system is shown schematically in FIG. 4, with a display driver 76 coupled to terminal PA7 of microprocessor 42 and providing signals to the compass display 36 (FIGS. 1 and 4).

Figure 5:
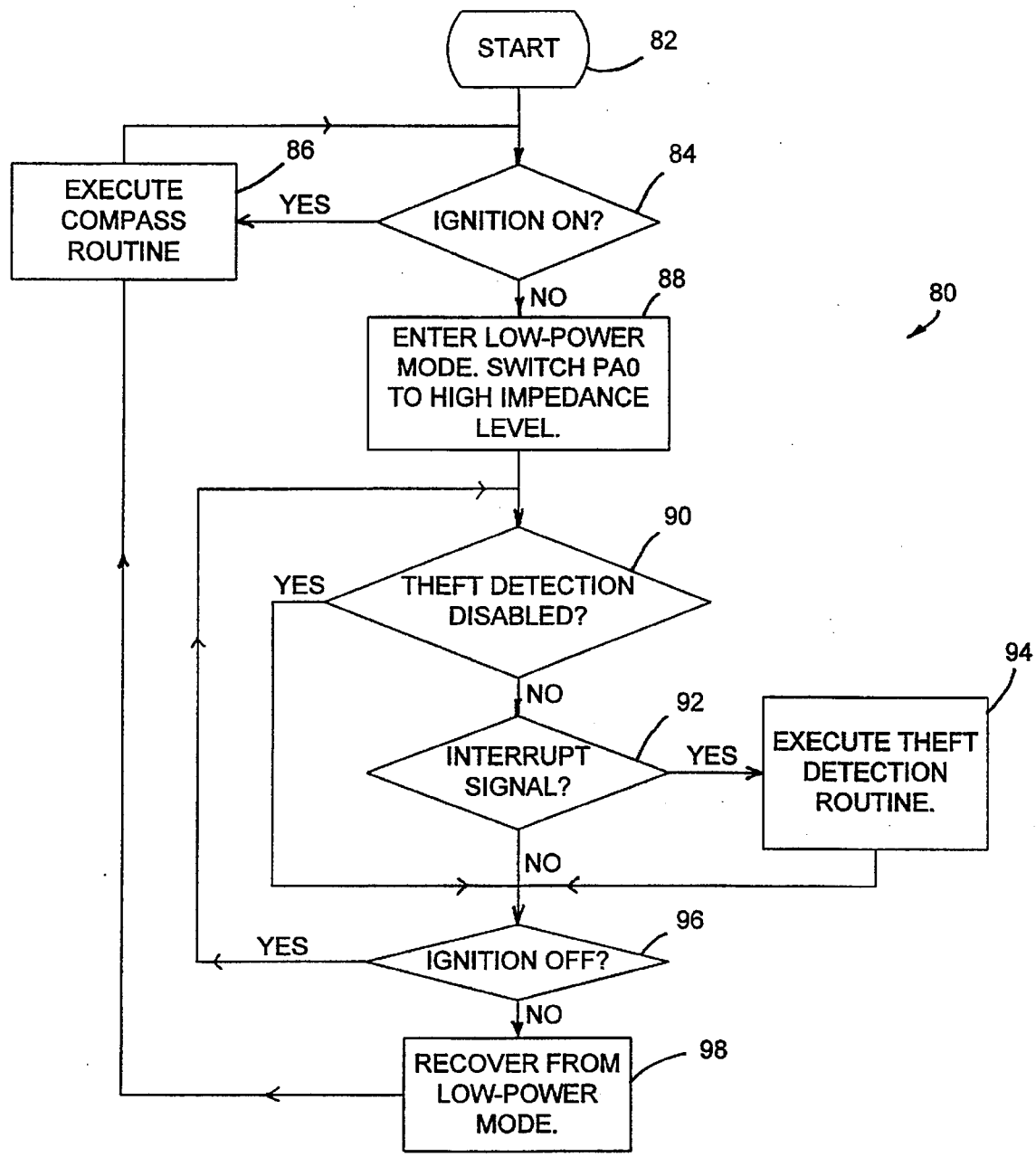
FIG. 5 is a flow diagram of the main program routine of the theft detection system of the present invention.

The operation of the theft detection system of the preferred embodiment of the present invention is now described in connection with FIG. 5 which is the flow diagram for the main program routine 80 for microprocessor 42. The program begins with block 82 which is the beginning of the main program routine. Next, block 84 determines if the vehicle's ignition system is on by analyzing the status of pin PA1 of microprocessor 42. As mentioned above, the theft detection system of the preferred embodiment is operational only when the ignition system of the vehicle is off. This provides protection during the typical theft situation when the vehicle is parked and left unattended. However, the preferred embodiment of the present invention also implements a compass system, as described above, when the ignition system of the vehicle is on. As such, if block 84 determines that the vehicle's ignition system is on, and if the preferred embodiment of FIG. 4 is incorporated into the system, the program proceeds to block 86 which executes a compass routine of a vehicle compass system with microprocessor 42 in an active mode of operation. After block 86, the program loops back to block 84. If block 84 determines that the vehicle's ignition system is off, then the program proceeds to block 88. Block 88 causes microprocessor 42 and interface circuit 44 to enter a low-power mode in which almost all functioning ceases in order to avoid draining the vehicle's battery. Power supply 46, however, is coupled to the vehicle's battery and continues to provide operating power to microprocessor 44 and circuit 52. In addition, microprocessor 42 switches port pin PA0 (FIGS. 3 and 4) to a high impedance level which causes capacitor 53 of timer circuit 52, which is in a fully charged state when the ignition is initially turned off; to begin to discharge through resistor 51 such that timer circuit 52 eventually provides an interrupt signal to microprocessor 42 as described above. In the preferred embodiment, the time for capacitor 53 to discharge such that an interrupt signal is generated is approximately five seconds.

Figure 6:
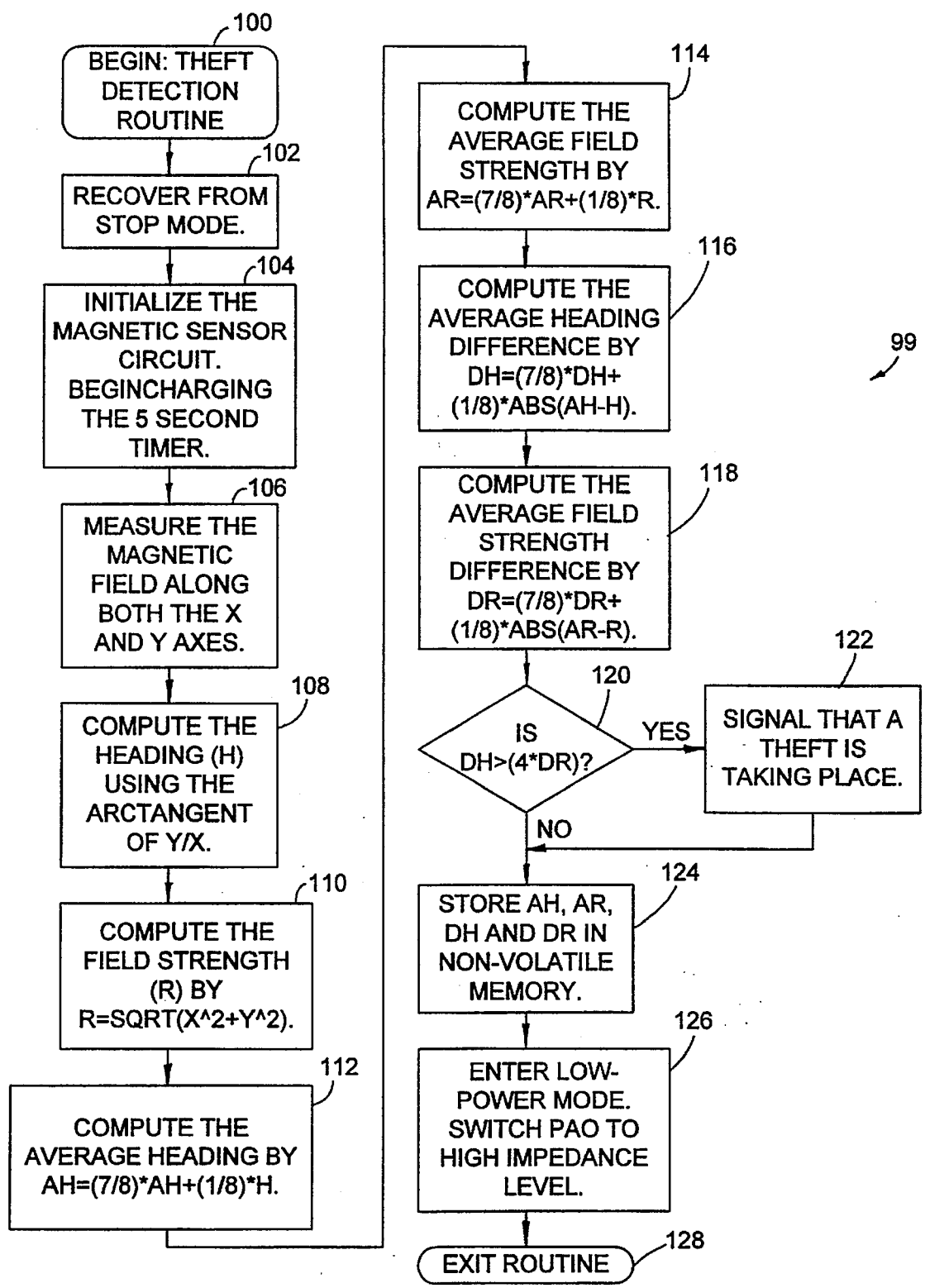
FIG. 6 is a flow diagram of the Theft Detection Routine of the theft detection system of the present invention.

After block 88, block 90 determines if the theft detection system is in a disabled state by means of operation of the disable circuit 48 connected to terminal PA6 of microprocessor 42. If the system is disabled, the program proceeds to block 96. If the system is not disabled, then block 92 determines if timer circuit 52 is providing an interrupt signal to terminal INT of microprocessor 42. If an interrupt signal is being provided, then the program proceeds to block 94 which executes the Theft Detection Routine 99 (FIG. 6). During execution of this routine, capacitor C1 is fully recharged so that it can again be discharged after one cycle through the routine is completed in order to again generate an interrupt signal. The Theft Detection Routine 99 is described in detail below in connection with FIG. 6.

After block 94, or if block 92 determines that an interrupt signal is not being provided, then the program proceeds to block 96. Block 96 determines if the vehicle's ignition system is still off by analyzing the status of pin PA1 of microprocessor 42. If the ignition system is still off, then the program loops back to block 90 and the above-mentioned cycle is repeated. As a result, the Theft Detection Routine is executed approximately every five seconds in the preferred embodiment of the present invention which corresponds to the time required for capacitor 53 to discharge such that an interrupt signal is generated. If block 96 determines that the ignition system is on, then block 98 causes microprocessor 42 and interface circuit 44 to recover from the low-power mode. The program then loops back to block 86 to execute the compass routine of the vehicle compass system while the vehicle's ignition system is on. A brief description of the Theft Detection Routine now follows.

The Theft Detection Routine of microprocessor 42 begins by causing the microprocessor and interface circuit 44 to recover from the low-power mode. Next, the magnetic field along both the North/South and East/West sensor channels is determined from the sensor data provided by interface circuit 44. Analyzing this sensor data in terms of its position on the X-Y coordinate plane, microprocessor 42 then calculates the vehicle heading and the magnetic field strength for that five-second period of time (measurement cycle). Across measurement cycles, microprocessor 42 maintains a running average for both the heading and field strength. Furthermore, the running average difference between each running average and the current heading or field strength is also maintained across measurement cycles. If microprocessor 42 determines that a predetermined relationship or difference exists between the average difference of the heading and the average difference of the field strength, then microprocessor 42 transmits a theft alarm signal via pin PA5 indicating that the vehicle is being stolen. In the preferred embodiment, this predetermined relationship is established when the average difference of the heading exceeds the average difference of the field strength by a predetermined amount. This corresponds to the situation where the sensor data is changing in a manner such that, over consecutive measurement cycles, the plot thereof substantially creates an arc on the X-Y coordinate plane. Such a change in sensor data indicates that the vehicle is moving and that its heading is changing as would occur when a stolen vehicle is towed away. The averaging employed in this theft detection process enables the system to accurately detect vehicle motion while preventing false detections such as when sensor 40 is affected by stray magnetic fields located near the vehicle or when temporarily erroneous sensor data is received. The extent of averaging can be increased or decreased, or even eliminated, depending on the amount of sensitivity that is desired. A detailed description of the Theft Detection Routine programming for microprocessor 42 to provide this system operation is now provided in connection with the flowchart of FIG. 6.

In discussing the flow diagram of FIG. 6 for the Theft Detection Routine 99 of microprocessor 42, the following symbols and their definitions are used:

X Variable: The East/West digital sensor data.
Y Variable: The North/South digital sensor data.
H Variable: The heading of the vehicle computed from the two axis magnetic field measurement.
R Variable: The field strength of the external field around the vehicle computed from the two axis magnetic field measurement.
AH Variable: The running average of H updated every measurement cycle.
AR Variable: The running average of R updated every measurement cycle.
DH Variable: The running average of the absolute difference between AH and H, updated every measurement cycle.
DR Variable: The running average of the absolute difference between AR and R, updated every measurement cycle.

Referring now to FIG. 6, shown is the Theft Detection Routine 99 of the programming for microprocessor 42. The routine is executed only when the vehicle's ignition system is off and after capacitor 53 of timer circuit 52 has sufficiently discharged such that an interrupt signal is applied to the INT pin of microprocessor 42. In the preferred embodiment, component values of timer circuit 52 are selected such that microprocessor 42 enters the active mode of operation and the Theft Detection Routine is executed approximately every five seconds when the vehicle's ignition is off. This corresponds to an average ignition off current draw through microprocessor 42 of less than 1 milliamp which is a low current draw to prevent the draining of the vehicle's battery.

Block 100 of FIG. 6 is the beginning of the Theft Detection Routine. After block 100, the program proceeds to block 102 which causes microprocessor 42 to recover from the low-power or "STOP" mode such that normal functioning of the microprocessor is initiated. Next, block 104 initializes the magnetic sensor circuit, comprising sensor 40 and interface circuit 44, terminates the high impedance level status of terminal PA0 of microprocessor 42, and begins charging capacitor 53 of timer circuit 52 via terminal PA0. Initialization of the magnetic sensor circuit involves supplying a signal from terminal PA4 of microprocessor 42 to interface circuit 44 instructing it to recover from its low-power mode, and waiting until circuit 44 has had an opportunity to stabilize. Charging of capacitor 53 is initiated so that it is fully charged by the time the execution of the Theft Detection Routine has been completed such that it can be subsequently discharged. To ensure that the execution of the Theft Detection Routine is of sufficient duration such that capacitor 53 is fully charged, delay loops (not shown) can be implemented in the programming in a conventional fashion. After block 104, the program proceeds to block 106 which collects eight-bit digital data from interface circuit 44 representing the magnetic field sensed on the North/South (Y axis) and East/West (X axis) channels of sensor 40. Next, block 108 calculates the heading H of the vehicle in a conventional manner using the following formula:

$$H = \arctan \frac{\text{(North/South sensor data)}}{\text{(East/West sensor data)}}$$

The program then proceeds to block 110 which calculates the magnetic field strength R of the field external to the vehicle using the following formula:

$$R = \text{squareroot } [(\textit{East/West sensor data})^2 + (\textit{North/South sensor data})^2]$$

The magnetic field strength R is represented by the radius of the circle plotted by the sensor data when the vehicle is moved in a 360° loop. Next, block 112 calculates the average of the vehicle heading H and stores it in variable AH using the following formula:

$$AH = [(\tfrac{7}{8})*AH] + [(\tfrac{1}{8})*H]$$

The multiplication factors used in this formula are designed to give the previously stored average heading more numerical weight than the current heading, and can be adjusted depending on the desired rate of change of the average heading. Because an averaged heading value is not available when the ignition is first turned off, variable AH is set to the current instantaneous heading H upon first pass through the Theft Detection Routine. After block 112, the program proceeds to block 114.

Block 114 calculates the average of the field strength R and stores it in variable AR using the following formula:

$$AR = [(\tfrac{7}{8})*AR] + [(\tfrac{1}{8})*R]$$

Similar to the above, the multiplication factors used in this formula are designed to give the previously stored average field strength more numerical weight than the current field strength, and can be adjusted depending on the desired rate of change of the average field strength. Because an averaged field strength value is not available when the ignition is first turned off, variable AR is set to the current instantaneous field strength R upon first pass through the Theft Detection Routine. Next, block 116 calculates the average heading difference and stores it as variable DH using the following formula:

$$DH = [(\tfrac{7}{8})*DH] + [(\tfrac{1}{8})*\textit{absolute value } (AH-H)]$$

Similar to the above, the multiplication factors used in this formula are designed to give the previously stored average heading difference more numerical weight than the current heading difference, and can be adjusted depending on the desired rate of change of the average heading difference. Variable DH is initialized to zero upon first pass through the Theft Detection Routine. After block 116, the program proceeds to block 118 which calculates the average field strength difference and stores it in variable DR using the following formula:

$$DR = [(\tfrac{7}{8})*DR] + [(\tfrac{1}{8})*\textit{absolute value } (AR-R)]$$

As above, the multiplication factors used in this formula are designed to give the previously stored average field strength difference more numerical weight than the current field strength difference, and can be adjusted depending on the desired rate of change of the average field strength difference. Variable DR is initialized to zero upon first pass through the Theft Detection Routine. After block 118, the program proceeds to block 120.

Block 120 determines if the current average heading difference exceeds the current average field strength difference by a predetermined amount. In the preferred embodiment, this predetermined mount is exceeded when the average heading difference is more than four times larger than the average difference of the field strength. If block 120 determines that the predetermined amount has been exceeded, then the program proceeds to block 122 which causes microprocessor 42 to signal via terminal PA5 that the vehicle is being stolen. After block 122, or if block 120 determines that the predetermined amount has not been exceeded, the program proceeds to block 124. Block 124 stores the current values of variables AH, AR, DH, and DR in non-volatile memory 50 so that they are maintained when microprocessor 42 subsequently enters the low-power mode. Next, block 126 causes microprocessor 42 and interface circuit 44 to reenter the low-power mode in order to conserve energy, and switches port pin PA0 to a high impedance level so capacitor 53 of timer circuit 52, having been fully charged, begins to discharge. The program then exits the Theft Detection Routine via block 128.

Although the preferred embodiment of the present invention detects theft of a vehicle by analyzing and comparing both heading and field strength information, an alternate embodiment can function by monitoring only the heading of the vehicle. Microprocessor 42 in such an embodiment can detect vehicle theft when the averaged difference of the heading exceeds a predetermined value or when a predetermined relationship exists between the current heading and at least one stored heading value. The only disadvantage of this embodiment is that a change in heading caused by outside influences other than movement of a vehicle can potentially cause an erroneous detection of vehicle theft. This problem is overcome in the preferred embodiment described above through comparison of the heading information to the averaged difference in field strength to ensure that the plot of sensor data substantially forms an arc which corresponds to movement of the vehicle.

As described above, the preferred embodiment of the theft detection system is operational only when a vehicle's ignition system is off. The advantage of such an embodiment is that it is a convenient means by which to provide a passive theft protection system that is automatically activated when the ignition is turned off without requiring a specific initiation step by the vehicle's operator. However, if the vehicle's ignition system is hot-wired after unauthorized entry, then the theft detection system may be deactivated depending on what is analyzed by microprocessor 42 via pin PA1 to determine the status of the ignition system. As such, theft protection may only be provided in the situation where the vehicle is stolen via towing or placement on a flat-bed truck. Some vehicles, though, may have the capability of detecting and differentiating between different phases of the ignition system cycle such that this disadvantage can be avoided. In particular, these vehicles can detect placement of an ignition key in the vehicle's ignition keyhole and supply this information to microprocessor 42 via pin PA1. As such, the theft detection systems of these vehicles can be programmed to deactivate only upon detection of that event so that the system remains armed if the vehicle's ignition is hot-wired.

Figure 7:
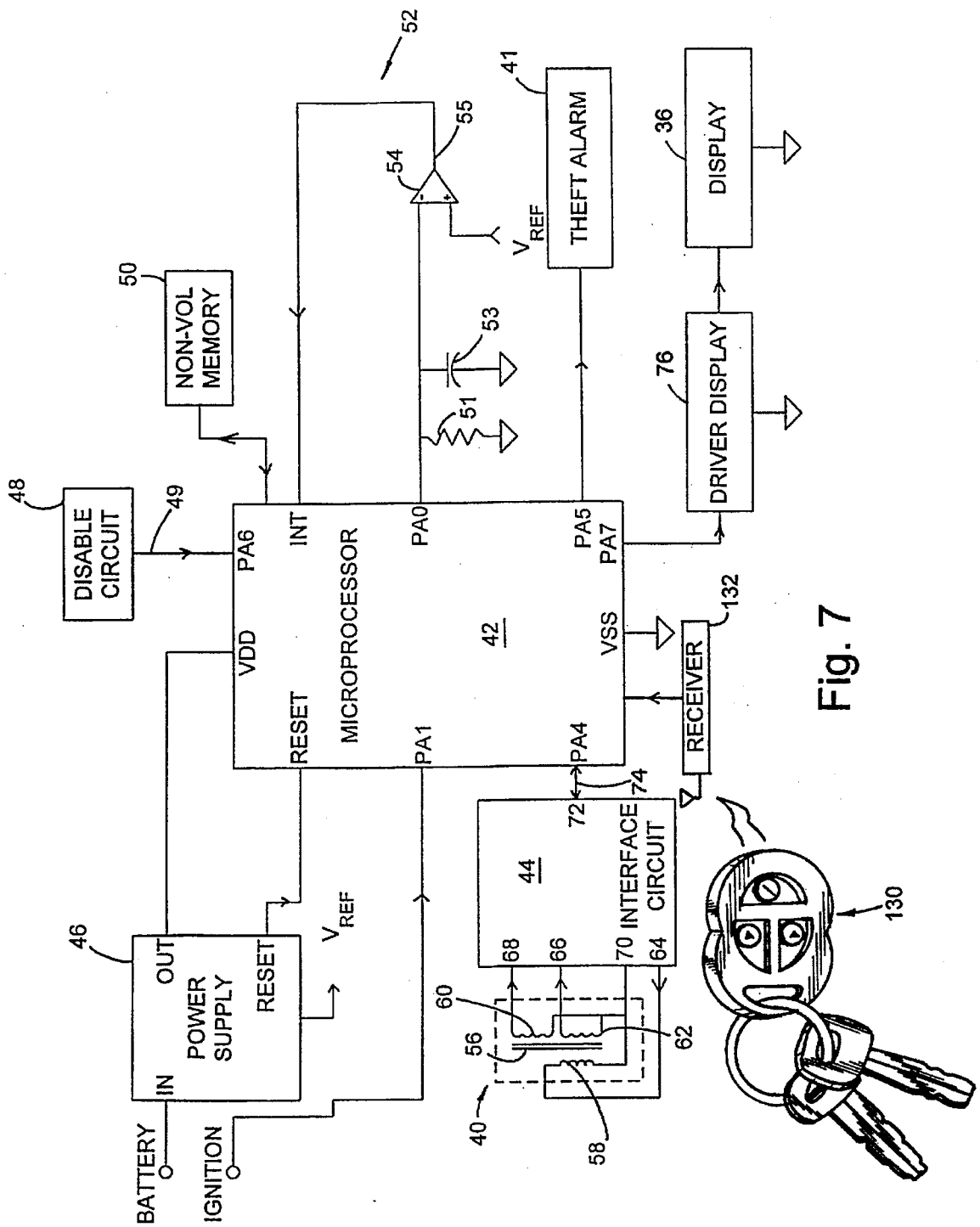
FIG. 7 is an electrical circuit diagram partly in block and schematic form of an alternate embodiment of the theft detection system of the present invention.
Figure 8:
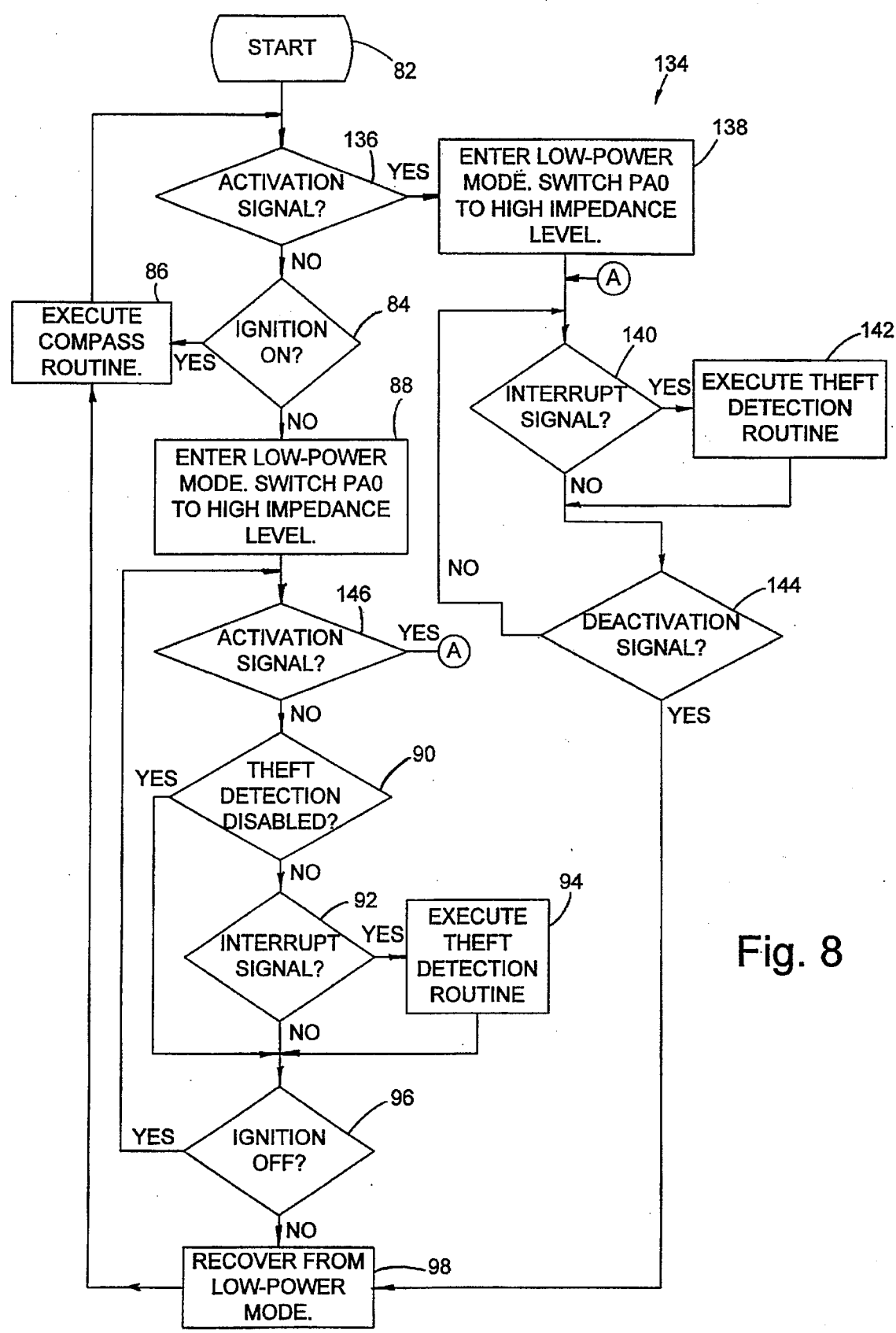
FIG. 8 is the flow diagram for the main program routine of the alternate embodiment of the theft detection system of the present invention.

An alternative embodiment of the present invention enables theft protection to be provided independent of the status of the vehicle's ignition. As shown in FIG. 7, this alternate embodiment includes an operator input circuit comprising, in the preferred embodiment, a transmitter located on a key FOB 130 and a receiver circuit 132 connected to microprocessor 42. Briefly described, activation of the theft detection system by the vehicle's operator may be achieved by means of transmitting a coded RF input signal from key FOB 130 to receiver circuit 132 before the vehicle is left unattended. The system then remains active until a second coded RF input signal is again transmitted via key FOB 130 and received by receiver circuit 132. The advantage of this embodiment is that theft protection can be provided even when the ignition system is on such that theft by means of hot-wiring the vehicle can be detected. In order to provide passive theft protection in case the vehicle's operator neglects to initiate an activation signal, the theft detection system may also be programmed to automatically activate when the ignition is turned off, as described above. A more detailed description of the operation of this system is now provided in connection with FIG. 8 which is the flow diagram for the main program routine 134 of the alternate embodiment of FIG. 7.

The main program routine 134 of the alternate embodiment is the same as the main program routine 80 described above except for the addition of blocks 136, 138, 140, 142, 144, and 146. After block 82 which is the beginning of the main program routine, block 136 determines if a coded activation input signal from FOB 130 has been received by receiver 132 which matches a predetermined code stored in the memory of microprocessor 42. If such a signal has been received, then the program proceeds to block 138 which causes microprocessor 42 and interface circuit 44 to enter the low-power mode, and switches port pin PA0 to a high impedance level so that capacitor 53 can begin to discharge. After block 138, the program proceeds to block 140 which determines if timer circuit 52 is providing an interrupt signal to terminal INT of microprocessor 42. If an interrupt signal is being provided, then the program proceeds to block 142 which executes the Theft Detection Routine described above in connection with FIG. 6. After block 142, or if block 140 determines that an interrupt signal is not being provided, then the program proceeds to block 144. Block 144 determines if a coded deactivation input signal has been received via receiver 132, which matches a predetermined code stored in the memory of microprocessor 42, to deactivate the theft detection system. If not, the program loops back to block 140 and the above-mentioned process repeats itself. If a deactivation input signal has been received, then the program proceeds to block 98 which causes microprocessor 42 and interface circuit 44 to enter the active mode of operation so that the compass routine of block 86 can be executed.

Returning to block 136, if an activation input signal has not been received, and the theft detection system is automatically implemented because the vehicle's ignition system is off, then the operation of the system proceeds as described above in connection with FIG. 5 except for the addition of block 146. If block 146 determines that a coded activation input signal has been received via the operator input circuit (i.e., receiver 132) which matches a predetermined code stored in the memory of microprocessor 42, then the program branches to block 140. This enables the theft detection system to remain activated, even after the ignition system is turned on, until a coded deactivation input signal is received.

The present invention provides an improved and relatively inexpensive electronic theft detection system that can detect vehicle theft in all situations. Furthermore, a theft detection system is provided having circuitry that is compatible with a vehicle compass system such that a combined theft detection and compass system can be conveniently implemented in the preferred embodiment.

The above description is considered that of the preferred embodiments only. Modifications of the invention will occur to those skilled in the art and to those who make or use the invention. Therefore, it is understood that the embodiments shown in the drawings and described above are for illustrative purposes and are not intended to limit the scope of protection of the invention, which is defined by the following claims as interpreted according to the principles of patent law.

The embodiments of the invention in which an exclusive property or privilege is claimed are defined as follows:

1. An electronic theft detection system for a vehicle comprising:

a magnetic field sensor for detecting the earth's magnetic field and for providing first electrical sensor signals representing a fixed direction of the vehicle in relation to the earth's magnetic field when parked;

a processing circuit coupled to said sensor for processing signals from said sensor, said processing circuit responsive to said first sensor signals for calculating and storing fixed direction information representing the heading of the vehicle when parked, said processing circuit comparing said fixed direction information with signals from said sensor representing current heading information for the vehicle and generating an alarm output signal indicating the vehicle has moved from a parked position and the current heading and said fixed direction information differ by a predetermined amount.

2. The system as defied in claim 1 wherein said fixed direction information includes at least one averaged value.

3. The system as defined in claim 1 wherein the vehicle includes an ignition circuit and said processing circuit processes said sensor signals when said processing circuit determines that the vehicle's ignition is off.

4. The system as defined in claim 3 and further including a disable circuit coupled to said processing circuit to provide a disable signal applied to said processing circuit to prevent the generation of an alarm output signal.

5. The system as defined in claim 4 wherein said disable circuit includes means for entering an operator code which matches a code Stored by said processing circuit.

6. The system as defined in claim 1 and further including an alarm coupled to said processing circuit and responsive to said alarm output signal for providing an alarm.

7. The system as defined in claim 1 wherein said magnetic field sensor is a flux-gate sensor.

8. The system as defined in claim 1 further including an overhead console for mounting to a roof of a vehicle and wherein said magnetic field sensor and said processing circuit are mounted to said overhead console.

9. The system as defined in claim 1 and further including an electrical compass display coupled to said processing circuit and wherein said processing circuit is responsive to signals from said magnetic field sensor when the vehicle is not parked to provide compass heading information to said display.

10. The system as defined in claim 1 and further including a trainable garage door opening transmitter.

11. An electronic theft detection system for a vehicle comprising:

a magnetic field sensor for detecting the earth's magnetic field and for providing electrical sensor signals representing the direction of the vehicle in relation to the earth's magnetic field when parked;

a processing circuit coupled to said sensor for processing said sensor signals, said processing circuit responsive to said sensor signals for calculating and storing information representing a heading of the vehicle when parked, said processing circuit comparing such stored information with current heading information and generating an alarm output signal indicating movement of the vehicle when a predetermined relationship exists between the current heading and said stored heading information; and a timer circuit coupled to said processing circuit for supplying an interrupt signal applied to said processing circuit for causing said processing circuit to exit a low-power mode of operation and to enter an active mode of operation.

12. The system as defined in claim 11 further comprising a non-volatile memory circuit coupled to said processing circuit for storing information while said processing circuit is in a low-power mode of operation.

13. The system as defined in claim 12 wherein said timer circuit periodically supplies said interrupt signal.

14. The system as defined in claim 13 wherein said timer circuit periodically supplies said interrupt signal about every five seconds.

15. An electronic theft detection system for a vehicle comprising:

a magnetic field sensor for detecting the earth's magnetic field and for providing signals representing a direction of the vehicle in relation to the earth's magnetic field; and a processing circuit coupled to said sensor for processing said sensor signals, said processing circuit responsive to said sensor signals for calculating and storing a current heading of the vehicle and the current field strength of the magnetic field detected by said sensor, said processing circuit comparing the current heading with at least one stored heading value and the current field strength with at least one stored field strength value, said processing circuit generating an output signal indicating unauthorized movement of the vehicle when the comparison indicates a predetermined difference in said stored and current sensor signals, wherein said predetermined difference represents a difference in heading which is at least four times greater than the average difference in field strength.

16. The system as defined in claim 15 wherein said at least one stored heading value and said at least one stored field strength value each include at least one averaged value.

17. The system as defined in claim 15 wherein said processing circuit processes said sensor signals when said processing circuit determines that the vehicle's ignition is off.

18. The system as defined in claim 17 and further including a disable circuit coupled to said processing circuit to provide a disable signal applied to said processing circuit to prevent the generation of an alarm output signal.

19. An electronic theft detection system for a vehicle comprising:

a magnetic field sensor for detecting the earth's magnetic field and for providing electrical sensor signals representing a direction of the vehicle in relation to the earth's magnetic field; and a processing circuit coupled to said sensor for processing said sensor signals, said processing circuit responsive to said sensor signals for calculating and storing a current heading of the vehicle and the current field strength of the magnetic field within the vehicle, said processing circuit calculating an averaged heading and field strength, said processing circuit calculating an averaged difference between said current heading and said averaged heading and an averaged difference between said current field strength and said averaged field strength, said processing circuit generating an alarm output signal indicating theft of the vehicle when said averaged difference in heading exceeds said averaged difference in field strength by a predetermined amount sufficient to indicate unauthorized movement of the vehicle.

20. The system as defined in claim 19 wherein said processing circuit processes said sensor signals when said processing circuit determines that the vehicle's ignition is off.

21. The system as defined in claim 20 and further including a disable circuit coupled to said processing circuit to provide a disable signal applied to said processing circuit to prevent the generation of an alarm output signal.

22. The system as defined in claim 21 wherein said disable circuit includes means for entering an operator code which matches a code stored by said processing circuit.

23. The system as defined in claim 19 wherein said alarm output signal indicating theft of the vehicle activates the vehicle's horn.

24. The system as defined in claim 23 wherein the vehicle includes an engine control and wherein said alarm output signal indicating theft of the vehicle is applied to said engine control to prevent operation of the vehicle's engine.

25. An electronic theft detection system for a vehicle comprising:

a magnetic field sensor for detecting the earth's magnetic field and for providing electrical sensor signals representing a direction of the vehicle in relation to the earth's magnetic field; and a processing circuit coupled to said sensor for processing said sensor signals, said processing circuit responsive to said sensor signals for calculating and storing a current heading of the vehicle and the current field strength of the magnetic field within the vehicle, said processing circuit calculating an averaged heading and field strength, said processing circuit calculating an averaged difference between said current heading and said averaged heading and an averaged difference between said current field strength and said averaged field strength, said processing circuit generating an alarm output signal indicating theft of the vehicle when said averaged difference in heading exceeds said averaged difference in field strength by a predetermined amount, wherein said predetermined amount comprises an averaged difference in heading which is at least four times greater than the averaged difference in field strength.

26. An electronic theft detection and compass system for a vehicle comprising:

a magnetic field sensor for detecting the earth's magnetic field and for providing electrical sensor signals representing a direction of the vehicle in relation to the earth's magnetic field;

a processing circuit coupled to said sensor for processing said sensor signals;

a display circuit coupled to said processing circuit;

said processing circuit responsive to said sensor signals for calculating and storing a current heading of the vehicle and for generating a display output signal to said display circuit for displaying the heading of the vehicle when in operation, said processing circuit comparing the current heading of the vehicle with at least one stored heading value and generating a theft alarm output signal indicating theft of the vehicle when a predetermined relationship exists between the current heading and said at least one stored heading value when the vehicle is parked; and a timer circuit coupled to said processing circuit for supplying an interrupt signal applied to said processing circuit for causing said processing circuit to exit a low-power mode of operation and to enter an active mode of operation.

27. The system as defined in claim 26 and further including a trainable garage door opening transmitter.

* * * * *

UNITED STATES PATENT AND TRADEMARK OFFICE
CERTIFICATE OF CORRECTION

Page 1 of 2

PATENT NO. : 5,654,686
DATED : August 5, 1997
INVENTORS : James R. Geschke et al.

It is certified that error appears in the above-identified patent and that said Letters Patent is hereby corrected as shown below:

Column 1, line 24;

"track" should be --truck--.

Column 1, line 31;

"Mother" should be --Another--.

Column 3, line 50;

"Corresponds" should be --corresponds--.

Column 6, line 9;

";" should be --,--.

Column 9, line 10;

"mount" should be --amount--.

Column 11, line 3;

delete --.--.

UNITED STATES PATENT AND TRADEMARK OFFICE
CERTIFICATE OF CORRECTION

PATENT NO. : 5,654,686
DATED : August 5, 1997
INVENTORS : James R. Geschke et al.

It is certified that error appears in the above-identified patent and that said Letters Patent is hereby corrected as shown below:

Column 11, line 25;

"the" should be --a--.

Column 11, line 34;

"defied" should be --defined--.

Column 11, line 46;

"Stored" should be --stored--.

Column 12, line 1, first occurrence;

"the" should be --a--.

Signed and Sealed this

Twenty-first Day of October 1997

Attest:

BRUCE LEHMAN

Attesting Officer

Commissioner of Patents and Trademarks